United States Patent
Herzog et al.

(10) Patent No.: US 10,442,877 B2
(45) Date of Patent: Oct. 15, 2019

(54) RAFT AGENT, POLYMERIZATION METHOD, POLYMER, RUBBER MIXTURE, AND USE THEREOF

(71) Applicant: Continental Reifen Deutschland GmbH, Hannover (DE)

(72) Inventors: Katharina Herzog, Harsum (DE); Lena Mueller, Lauenhagen (DE); Carla Recker, Hannover (DE); Noa Pruss, Frankfurt (DE); Phillipp Vana, Bad Gandersheim (DE); Cathrin Sonja Conrad, Eschborn (DE)

(73) Assignee: Continental Reifen Deutschland GmbH, Hannover (DE)

( * ) Notice: Subject to any disclaimer, the term of this patent is extended or adjusted under 35 U.S.C. 154(b) by 66 days.

(21) Appl. No.: 15/810,561

(22) Filed: Nov. 13, 2017

(65) Prior Publication Data
US 2018/0086865 A1 Mar. 29, 2018

Related U.S. Application Data

(63) Continuation of application No. PCT/EP2016/060384, filed on May 10, 2016.

(30) Foreign Application Priority Data

May 12, 2015 (DE) .......... 10 2015 208 810

(51) Int. Cl.
*C08F 120/14* (2006.01)
*B29B 7/74* (2006.01)
(Continued)

(52) U.S. Cl.
CPC .......... *C08F 120/14* (2013.01); *B29B 7/7495* (2013.01); *B60C 1/0016* (2013.01);
(Continued)

(58) Field of Classification Search
CPC .................................................. C08F 2438/03
See application file for complete search history.

(56) References Cited

U.S. PATENT DOCUMENTS 7,528,204 B2    5/2009   Parker et al.
7,625,985 B1   12/2009   Parker et al.
(Continued)

FOREIGN PATENT DOCUMENTS

| DE | 69808622 T2 | 6/2003 |
| EP | 2851377 A1 | 3/2015 |
| WO | 9909036 A1 | 2/1999 |

OTHER PUBLICATIONS

International Search Report dated Aug. 8, 2016 of international application PCT/EP2016/060384 on which this application is based.
(Continued)

*Primary Examiner* — Mark S Kaucher

(57) ABSTRACT

Disclosed are RAFT agents, a method of polymerizing alkenes, dienes, vinyl compounds, and/or vinylidene compounds using at least one RAFT agent, polymers prepared by the methods, sulfur-crosslinkable rubber mixtures prepared by the methods, and motor vehicle tires, cords, belts, or hoses incorporating the sulfur-crosslinkable rubber mixtures. In one embodiment, the RAFT agent has the formula Z—C(=S)—S—R—S—P or P—S—Z—C(=S)—S—R—S—P, wherein P is a protecting group, and Z and R are typical RAFT Z and R groups.

19 Claims, 1 Drawing Sheet

(51) Int. Cl.
  *C08F 236/06* (2006.01)
  *C08F 236/08* (2006.01)
  *C08F 236/10* (2006.01)
  *C08F 236/12* (2006.01)
  *B60C 1/00* (2006.01)
  *C08F 293/00* (2006.01)

(52) U.S. Cl.
  CPC .......... *C08F 236/06* (2013.01); *C08F 236/08* (2013.01); *C08F 236/10* (2013.01); *C08F 236/12* (2013.01); *C08F 293/005* (2013.01); *C08F 2438/03* (2013.01); *C08F 2810/40* (2013.01)

(56) References Cited

U.S. PATENT DOCUMENTS

| | | |
|---|---|---|
| 7,968,633 B2 | 6/2011 | York et al. |
| 7,968,634 B2 | 6/2011 | York et al. |
| 7,968,635 B2 | 6/2011 | York et al. |
| 7,968,636 B2 | 6/2011 | York et al. |
| 8,182,626 B2 | 5/2012 | Recker et al. |
| 8,252,863 B2 | 8/2012 | Hasse et al. |
| 8,912,267 B2 | 12/2014 | Herzog et al. |
| 2010/0184922 A1 | 7/2010 | Kwag et al. |
| 2012/0004381 A1 | 1/2012 | Rizzardo et al. |
| 2013/0131240 A1 | 5/2013 | Uekita et al. |
| 2013/0165587 A1 | 6/2013 | Mruk et al. |
| 2014/0148554 A1 | 5/2014 | Ma et al. |
| 2014/0343192 A1 | 11/2014 | Cochran et al. |

OTHER PUBLICATIONS

Moad, G. et al, "A RAFT Tutorial", The Strem Chemiker 2011, 25(1), pp. 2 to 10.

Moad G. et al: "Radical addition—fragmentation chemistry in polymer synthesis", CSIRO Molecular and Health Technologies, Bayview Ave., Clayton, Victoria 3168, Australia, ScienceDirect, Polymer 49 (2008), pp. 1079 to 1131.

RAFT AGENT, POLYMERIZATION METHOD, POLYMER, RUBBER MIXTURE, AND USE THEREOF

CROSS REFERENCE TO RELATED APPLICATIONS

This application is a continuation application of international patent application PCT/EP2016/060384, filed May 10, 2016, designating the United States and claiming priority from German application 10 2015 208 810.3, filed May 12, 2015, the entire content of both applications is incorporated herein by reference.

FIELD OF THE INVENTION

Disclosed are RAFT agents, methods of polymerizing dienes, unsaturated vinyl compounds, and/or vinylidene compounds using at least one RAFT agent, a polymer prepared by the methods, sulfur-crosslinkable rubber mixtures prepared by the methods, and production of motor vehicle tires, cords, belts or hoses using the sulfur-crosslinkable rubber mixtures.

BACKGROUND OF THE INVENTION

The "reversible addition fragmentation chain transfer" (RAFT) process is a promising method of conducting controlled free-radical polymerizations.

The structural attachment of the polymer to the surface can be controlled via the choice and the chemical structure of what are called the RAFT agents, as described inter alia in DE 69808622 T3.

In the case of controlled free-radical polymerization too, the RAFT agents known in the prior art give rise to polymers which, after being mixed into a rubber mixture, especially a sulfur-crosslinkable rubber mixture for motor vehicle tires, cords, belts, or hoses, and after vulcanization (sulfur crosslinking), have a multitude of free chain ends ("dangling ends"). The greater the number of free chain ends, the greater the energy loss and hence the build-up of heat in the rubber mixture, since the free polymer chain ends are particularly mobile and convert energy to kinetic energy. The rubber mixture therefore has an energy-damping effect, which has an adverse effect on rolling resistance when used, for example, in motor vehicle tires.

SUMMARY OF THE INVENTION

Disclosed are RAFT agents with which it is possible to prepare a polymer with which an improvement in rolling resistance characteristics is achieved in a vulcanized rubber mixture.

In one embodiment, the RAFT agent has the formula of formula I):

Z—C(=S)—S—R—S—P     I)

wherein
Z is a Z group typical of RAFT polymerization, R is an R group typical of RAFT polymerization,
C is a carbon atom,
S is a sulfur atom,
P is a protecting group selected from the group comprising
S(=O)$_2$—R$^1$,
S—C(=S)—N—R$^2$R$^3$,
C(=O)—R$^4$,
N—R$^5$R$^6$,
SiR$^7$R$^8$R$^9$,
S(=O)$_2$—OM,
R$^1$=alkyl, benzyl or phenyl,
R$^2$ and R$^3$=alkyl, benzyl or phenyl,
R$^4$=alkyl,
R$^5$=hydrogen atom (H), alkyl, benzyl or phenyl,
R$^6$=alkyl, benzyl or phenyl,
R$^7$, R$^8$ and R$^9$=alkyl or benzyl, and
M=Na, K or H.

The compound of formula I), in the molecular moiety Z—C(=S)—S—R, has the typical features of a RAFT agent.

In one embodiment, the RAFT agent has an —S—P group, and hence a protected mercapto group which is deprotected at a later stage in the vulcanization of the polymers thus prepared, such that the sulfur atom of this mercapto group can become involved in the vulcanization. Thus, this chain end of the polymer, after the vulcanization, is involved in a network node, and so does not take the form of a free energy-damping chain end.

In the context of the present RAFT agents, expressions such as "polymer prepared with the RAFT agent" are understood to mean that the polymerization for preparation of the polymer is effected as a RAFT polymerization using the agent mentioned, including the RAFT-typical reaction conditions.

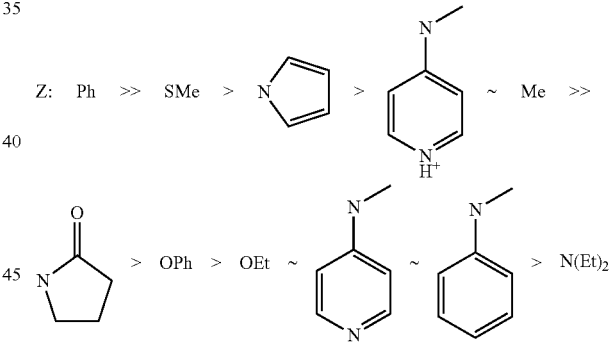

Figure 2:
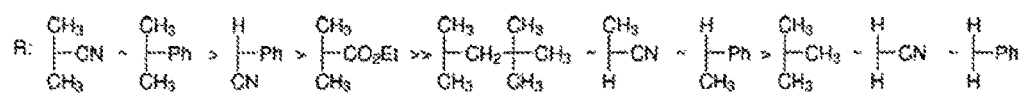

FIG. 2 shows typical R groups of RAFT agents, sorted by reactivity/suitability for polymerization of styrene; and,

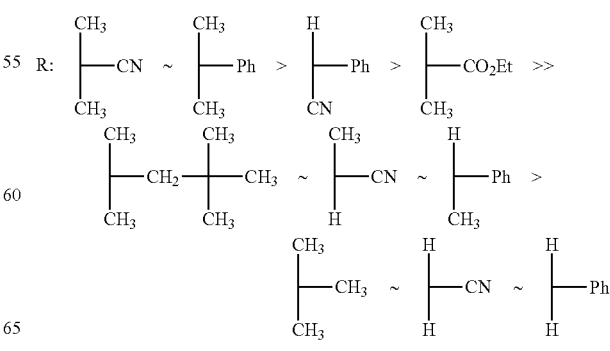

Figure 3:
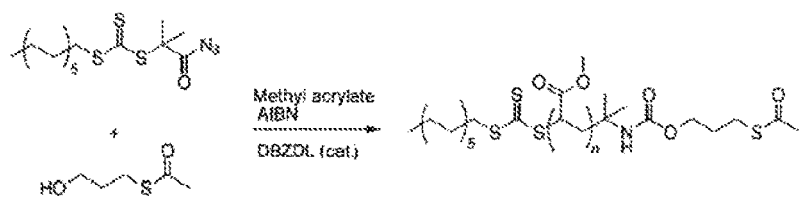

FIG. 3 shows a schematic diagram of the preparation of the macro-RAFT agent of formula II).

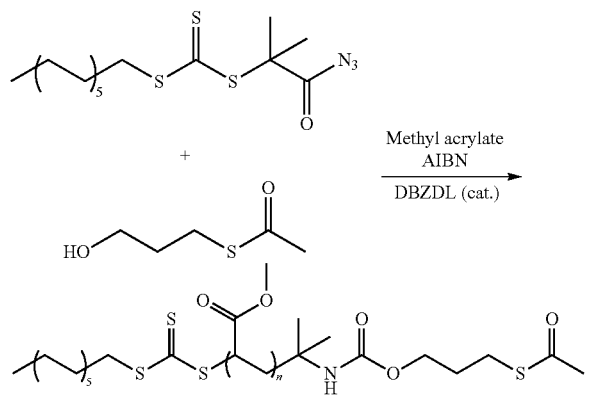

DESCRIPTION OF THE PREFERRED EMBODIMENTS OF THE INVENTION

Figure 1:
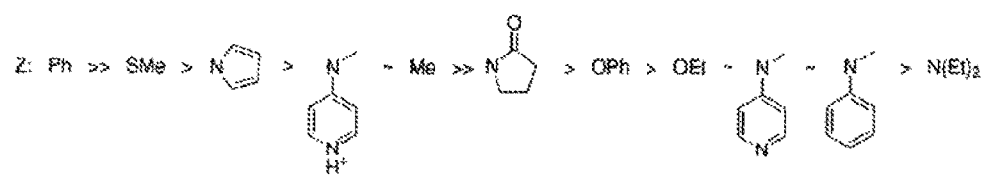
FIG. 1 shows typical Z groups of RAFT agents, sorted by reactivity/suitability for polymerization of styrene; (Source: G. Moad, E. Rizzardo, S. H. Thang, The Strem Chemiker 2011, 25(1), 2 to 10.)

Typical Z groups include but are not limited to the chemical groups depicted in FIG. 1, for example. The groups containing heteroatoms shown in FIG. 1 are each represented such that one valence is absent on one of the heteroatoms. In that case, the attachment to the —C(=S)—S—R—S—P radical of the RAFT agent is via the heteroatom in each case.

Typical R groups include but are not limited to the chemical groups depicted in FIG. 2, for example. The groups shown in FIG. 2 are represented such that one valence on the central carbon atom is absent in each case (since all the C—H bonds present are shown), and so the attachment to the Z—C(=S)—S— radical of the RAFT agent is to the central carbon atom mentioned. For attachment to —S—P of the agent of formula I), a further free valence is necessary, which arises in a formal sense, for example, through detachment of one of the hydrogen atoms of the groups enumerated.

In FIGS. 1 and 2, Ph=phenyl, Me=methyl, Et=ethyl. The other letters represent the respective symbols of the chemical elements.

Both the Z groups and R groups can, as well as the groups adduced by way of example in FIGS. 1 and 2, have additional molecular moieties that function as "spacers". Spacers are preferably alkyl groups or alkanoyl groups having 1 to 10 and preferably 3 to 10 carbon atoms.

All the R and Z groups disclosed in the publication G. Moad, E. Rizzardo, S. H. Thang, *Polymer* 2008, 49(5), 1079-1131 are also conceivable.

In an embodiment, the Z group is selected from:
a) phenyl (Ph shown in FIG. 1),
b) phenoxy (OPh shown in FIG. 1),
c) alkoxy (O-alkyl) having 1 to 30 carbon atoms, or 1 to 20 carbon atoms, where the alkyl over and above 3 carbon atoms can be branched or unbranched, for example OEt having 2 carbon atoms (see FIG. 1),
d) alkyl having 1 to 30 carbon atoms, or 1 to 20 carbon atoms, where the alkyl over and above 3 carbon atoms can be branched or unbranched, for example methyl (Me, see FIG. 1),
e) S-alkyl having 1 to 30 carbon atoms, or 1 to 20 carbon atoms, where the attachment to the —C(=S)—S—R—S—P radical of the RAFT agent is via the sulfur atom, where the alkyl over and above 3 carbon atoms can be branched or unbranched, for example SMe, that is S-methyl having 1 carbon atom (shown in FIG. 1), or S—$C_{12}H_{25}$ as shown in formula II) (see below),
f) heterocyclic groups such as, pyrrolyl, for example, 1H-pyrrolyl-1-yl (see FIG. 1), or pyridine-derived groups such as N-methyl-N-(4-pyridinyl) in the protonated form methyl(pyridin-1-ium-4-yl)amino or deprotonated form methyl(pyridin-4-yl)amino (see FIG. 1) or groups derived from 2-oxopyrrolidine, such as 2-oxopyrrolidin-1-yl (see FIG. 1),
alkyl(phenyl)amino having 1 to 30 carbon atoms, or 1 to 20 carbon atoms, in the alkyl group, where the attachment to the —C(=S)—S—R—S—P radical of the RAFT agent is via the nitrogen atom, and where the alkyl over and above 3 carbon atoms can be branched or unbranched, for example methylphenylamino (see FIG. 1), h) dialkylamino having 1 to 30, or 1 to 20, or 1 to 10, or 1 to 5 carbon atoms in each alkyl chain, where the alkyl groups over and above 3 carbon atoms can independently be branched or unbranched, where, in all the groups, the attachment to the —C(=S)—S—R—S—P radical of the RAFT agent is via the nitrogen atom and where the two alkyl groups can be the same or different, for example diethylamino (see FIG. 1).

In one embodiment, the R group is selected from:
a) cyanoisopropyl (2-cyanopropan-2-yl as shown in FIG. 2),
b) 2-phenylpropan-2-yl (cumyl as shown in FIG. 2),
c) cyano(phenyl)methyl (as shown in FIG. 2),
d) 1-ethoxy-2-methyl-1-oxopropan-2-yl (as shown in FIG. 2),
e) 2,4,4-trimethylpentan-2-yl (as shown in FIG. 2),
f) 1-cyanoethyl (as shown in FIG. 2),
g) 1-phenylethyl (as shown in FIG. 2), h) tert-butyl (as shown in FIG. 2),
i) cyanomethyl (as shown in FIG. 2),
j) benzyl (as shown in FIG. 2), and
k) polymethacrylates that, as a result of the synthesis, can have a carbamate group or a dithiocarbamate group, where the attachment to the Z—C(=S)—S— radical of the RAFT agent is via the secondary carbon atom of the first methacrylate unit of the polymethacrylate group, for example the polymethacrylate-carbamate group shown in formula II) (see, in FIG. 3, the molecular moiety in the right-hand molecule corresponding to R), in which the attachment to the —S—P moiety of the agent is via the carbamate group present.

RAFT agents having representatives of the groups mentioned under k) as R group are macro-RAFT agents; see below.

The $R^1$ to $R^9$ radicals in the protecting group P that are mentioned in formula I) can, as detailed above, be alkyl groups, such as alkyl groups having 1 to 10 carbon atoms. In formula I), O=oxygen atom, N=nitrogen atom,
Na=sodium, which is in the form of $Na^+$,
K=potassium, which is in the form of $K^+$.

In one embodiment, the RAFT agent is the compound of formula II):

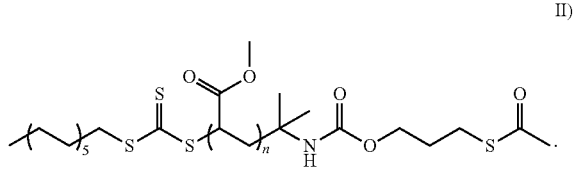

In this context, the RAFT agent has the S—C(=O)—CH$_3$ moiety in the form of a protected mercapto group.

The compound II) forms part of the class of the macro-RAFT agents with n=13 to 22, for example, 15.3 or 18.5. The compound of formula II) thus can have a number-average molar mass (or molar mass distribution) Mn according to GPC of 1600 to 2365 g/mol, for example, 1797 g/mol or 2070 g/mol.

The compound II) can have in one embodiment a polydispersity (Mw/Mn) of 1.2 to 1.4, for example, 1.35. Mw here is the weight-average molar mass distribution according to GPC.

The agent of formula II) is prepared by the reaction of an azide-containing RAFT agent (abbreviated for the sake of simplicity to RAFT-N$_3$) with an alcohol having a protected mercapto group, as shown in FIG. 3. In this context, AIBN is the abbreviation for the chemical compound azobis(isobutyronitrile).

DBZDL is the abbreviation for the chemical compound dibutyltin dilaurate, which serves as catalyst in the reaction. The reaction according to FIG. 3 is effected at 65° C. over 20 hours, where the molar ratios of the compounds mentioned are as follows: 90.74 mol % of methyl methacrylate to 2.27 mol % of RAFT-N$_3$ to 6.63 mol % of alcohol to 0.41 mol % of DBZDL to 0.22 mol % of AIBN.

For the determination of the molar mass or the molar mass distribution by means of GPC, in one embodiment, the following measurement conditions are applicable: SEC Analysis Systems 1260 Infinity from PSS Agilent with: PSS Agilent Technologies 1260 Iso Pump G1310B (HPLC pump), an Agilent 1260 ALS G1329B autosampler, an Agilent 1260 ALS injector, a precolumn (PSS SDV, 8×50 mm, particle size 5 µm), three separation columns (PSS SDV, 8×300 mm, particle size: 5 µm, pore size 10$^5$ (ten to the power of five) Å, 10$^3$ (ten to the power of three) Å and 10$^2$ (ten to the power of two) Å) and the detectors; PSS Agilent Technologies 1260 VWDVL UV detector at a wavelength of 310 nm and the PSS Agilent Technologies 1260 RID RI detector utilized; THF eluent (HPLC-grade) with toluene (>99.7%, dry) as internal standard (flow rate 1.0 mL/min at 35° C.). The system is calibrated with polystyrene standards having low polydispersity of PSS. For evaluation, the PSS WinGPC software is used. The detected intensities are standardized to 1 and, unless stated otherwise, are the signal from the RI detector.

A further embodiment of the disclosed RAFT agents] that achieves the object stated above is the RAFT agent of formula III)

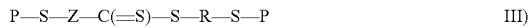

P—S—Z—C(=S)—S—R—S—P    III)

where all the details given for formula I) are applicable to P, S, Z, C, R, including the description of the possible R$^1$ to R$^9$ radicals and of the Z and R groups.

The compound of formula III) thus has a protected mercapto group at both ends of the molecule, which means that, according to polymerization conditions, there is a sulfur atom present at both chain ends of the polymer thus prepared, which takes part in the vulcanization, such that the number of free chain ends can be reduced further.

Provided also are methods of polymerizing alkenes, dienes, vinyl compounds, and/or vinylidene compounds using at least one of the RAFT agents described above. Provided are also methods of preparing a polymer from at least one monomer selected from alkenes, dienes, vinyl compounds, and/or vinylidene compounds using at least one of the RAFT agents described above.

The method of polymerization here is a RAFT polymerization using at least one of the above-described RAFT agents.

Dienes, in accordance with Römpp Online, are understood to mean unsaturated aliphatic and cycloaliphatic hydrocarbons containing two double bonds in the molecule. The two double bonds can be conjugated. The conjugated diene can be selected from the group consisting of, 1,3-butadiene (butadiene), 2-methylbuta-1,3-diene (isoprene=2-(C$_1$-C$_5$-alkyl)-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and/or 2-chloro-1,3-butadiene (chloroprene).

In one embodiment, the diene is isoprene, butadiene, or chloroprene.

Alkenes that can be involved in the polymerization as monomers are aliphatic compounds having a double bond, such as ethene, propene, butene, pentene, and hexene.

The term "vinyl compound" as used herein encompasses all chemical compounds having at least one vinyl group, such as acrylates, methacrylates, acrylic acid, methacrylic acid, acrylonitrile, and vinylaromatic compounds.

In one embodiment of the disclosed RAFT compounds, the vinyl compound comprises at least one vinyl compound which, apart from the vinyl group, has at least one further unsaturated group carbon group, such as, more particularly, a double bond or an aromatic radical.

In another embodiment, the vinyl compound comprises at least one vinylaromatic compound.

In the context of the present disclosure, the term "vinylaromatic compound" encompasses monovinylaromatic compounds, that is, compounds in which only one vinyl group is bound to an aromatic group, and vinylaromatic compounds in which two or more vinyl groups are bound to an aromatic group.

Any vinylaromatic compound known to those skilled in the art is conceivable as vinylaromatic compound. The vinylaromatic compound can be selected from a group comprising, or consisting of, styrene, C$_{1-4}$-alkyl-substituted styrenes, stilbene, vinylbenzyldimethylamine, 4-vinylbenzyl dimethylaminoethyl ether, N,N-dimethylaminoethylstyrene, tert-butoxystyrene, vinylpyridine, and/or divinylaromatic compounds.

The C$_{1-4}$-alkyl-substituted styrenes can, for example, be 2-methylstyrene, 3-methylstyrene, 4-methylstyrene, 2,4-dimethylstyrene, 2,4,6-trimethylstyrene, alpha-methylstyrene, 2,4-diisopropylstyrene, and/or 4-tert-butylstyrene.

The term "C$_{1-4}$-alkyl-substituted" as used herein means that an alkyl radical having 1 to 4 carbon atoms is present as a substituent for a hydrogen atom.

The divinylaromatic compounds can be, for example, 1,2-divinylbenzene, 1,3-divinylbenzene, and/or 1,4-divinylbenzene.

As used herein, the term vinylidene compounds, in accordance with Römpp Online, are understood to mean chemical compounds having the atomic moiety R$_1$R$_2$=C=CH$_2$ bonded via a double bond, for example Cl$_2$C=CH$_2$ or F$_2$C=CH$_2$.

In one embodiment, the alkene can be selected from a group consisting of ethene, propene, butene, pentene, and/or hexene, and the diene can be selected from a group consisting of 1,3-butadiene, 2-methylbuta-1,3-diene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and/or 2-chloro-1,3-butadiene, and the vinyl compound can be an acrylate, methacrylates, acrylic acid, methacrylic acid, acrylonitrile, and/or a vinylaromatic compound selected from the group consisting of styrene, 2-methylstyrene, 3-methylstyrene, 4-methylstyrene, 2,4-dimethylstyrene, 2,4,6-trimethylstyrene, alpha-methylstyrene, 2,4-diisopropylstyrene, 4-tert-butylstyrene, stilbene, vinylbenzyldimethylamine, 4-vinylbenzyl dimethylaminoethyl ether, N,N-dimethylaminoethylstyrene, tert-butoxystyrene, vinylpyridine, 1,2-divinylbenzene, 1,3-divinylbenzene, and/or 1,4-divinylbenzene.

The method of RAFT polymerization using at least one of the above-described RAFT agents is described hereinafter using the example of the polymerization of styrene using the RAFT agent of formula II).

The method is not limited to styrene but can be used in the preparation of all polymers from the above-described monomers, including for preparation of copolymers from three or more different monomers.

The compound of formula II) with Mn=1797 g/mol and a polydispersity of 1.35 was used in a styrene polymerization. For the mean molar mass Mn of the RAFT agent, the styrene calibration of the GPC was adjusted to a methyl acrylate polymer with the aid of Mark-Houwink coefficients. This served the purpose of as correctly as possible measuring the molar mass of the polymeric RAFT agent, with which it was possible to correctly calculate the concentrations in the subsequent styrene polymerization.

The following were used in the RAFT polymerization: 99.66 mol % of styrene and 0.05 mol % of the compound of formula II) with Mn=1797 g/mol and a polydispersity of 1.35 and 0.29 mol % of AIBN.

The polymerization was effected at 60° C.

A RAFT-polymerized styrene was prepared, having an Mn of 5863 g/mol and a polydispersity of 1.21. The Mn of the polystyrene prepared was determined by means of GPC with styrene calibration.

Also disclosed herein are polymers prepared by these methods, for example, a polystyrene that has been prepared as described above using the illustrative agent II).

In one embodiment, the polymer can also be a copolymer of three or more different monomers.

Exemplary polymers that are prepared by the disclosed methods include polystyrene, polyisoprene (IR, isoprene rubber), polybutadiene (BR, butadiene rubber), styrene-butadiene copolymer (SBR), chloroprene rubber (CR), nitrile rubber (NBR, copolymerization of acrylonitrile and buta-1,3-diene), hydrogenated nitrile rubber (HNBR), styrene-isoprene copolymers (SIR), styrene-isoprene-butadiene copolymers (SIBR), ethylene-propylene elastomers (EPM) such as ethylene-propylene copolymer (EPM), and EPDM rubber (terpolymers of ethene, propene and a non-conjugated diene). The disclosed polymers, in contrast with the prior art compounds, have the protected mercapto group S—P on at least one chain end, as shown in formula I) and III).

The disclosed RAFT agents thus remain at the chain ends of the disclosed polymers on completion of the RAFT polymerization. In this case, for example, at least the —R—S—P molecular moiety of the RAFT agent remains at the start of the polymer chain and hence at a first chain end. The further molecular moiety Z—C(=S)—S—, in one embodiment of the invention, likewise remains on the polymer chain, specifically at the end of the polymer chain and hence at the second chain end.

Also disclosed are sulfur-crosslinkable rubber mixtures comprising at least one of the disclosed polymers prepared as described above.

The disclosed sulfur-crosslinkable rubber mixtures comprise at least one of the polymers prepared as described above and can also additionally comprise at least one diene rubber known in the prior art.

Diene rubbers refer to rubbers that arise through polymerization or copolymerization of dienes and/or cycloalkenes and hence have C=C double bonds either in the main chain or in the side groups.

In one embodiment, the at least one diene rubber can be natural polyisoprene, synthetic polyisoprene, polybutadiene (butadiene rubber), unfunctionalized styrene-butadiene copolymer (styrene-butadiene rubber), epoxidized polyisoprene, styrene-isoprene rubber, halobutyl rubber, polynorbornene, isoprene-isobutylene copolymer, ethylene-propylene-diene rubber, nitrile rubber, chloroprene rubber, acrylate rubber, fluoro rubber, silicone rubber, polysulfide rubber, epichlorohydrin rubber, styrene-isoprene-butadiene terpolymer, hydrogenated acrylonitrile-butadiene rubber, and/or hydrogenated styrene-butadiene rubber.

In some embodiments, nitrile rubber, hydrogenated acrylonitrile-butadiene rubber, chloroprene rubber, butyl rubber, halobutyl rubber, or ethylene-propylene-diene rubber, for example, are used in the production of industrial rubber articles such as cords, belts, hoses, and/or shoe soles.

The terms "vulcanized" and "crosslinked" are used synonymously herein.

In one exemplary embodiment, the rubber mixture disclosed herein comprises at least one filler, such as silica and carbon black, and optionally further comprises known polar and/or nonpolar fillers, such as aluminosilicates, chalk, kaolin, starch, magnesium oxide, titanium dioxide, and/or rubber gels, and also carbon nanotubes (CNTs, including discrete CNTs, called hollow carbon fibers (HCFs), and modified CNTs containing one or more functional groups, such as hydroxyl, carboxyl, and carbonyl groups), graphite, graphenes, and/or what are commonly called "carbon-silica dual-phase filler").

If the filler is at least one silica, the rubber mixture can contain 1 to 300 phr, 1 to 200 phr, or 1 to 150 phr, of at least one silica.

If the filler is at least one carbon black, the rubber mixture can contain 1 to 200 phr, 1 to 170 phr, or 1 to 100 phr of at least one carbon black.

The silicas can be the silicas known to those skilled in the art that are suitable as filler for tire rubber mixtures. For example, a finely divided precipitated silica having a nitrogen surface area (BET surface area) (in accordance with DIN ISO 9277 and DIN 66132) of 35 to 350 $m^2/g$, 60 to 260 $m^2/g$, or 120 to 230 $m^2/g$, and a CTAB surface area (in accordance with ASTM D 3765) of 30 to 400 $m^2/g$, 60 to 250 $m^2/g$, or 120 to 230 $m^2/g$ can be used.

If the rubber mixture comprises carbon black, all types of carbon black known to those skilled in the art are can be used. For example, a carbon black having an iodine absorption number to ASTM D 1510 of 30 to 180 g/kg or 30 to 130 g/kg, and a DBP number to ASTM D 2414 of 80 to 200 mL/100 g, 100 to 200 mL/100 g, or 100 to 180 mL/100 g can be used.

The disclosed rubber mixtures can also comprise a mixture of two or more of the above-described fillers.

In one embodiment, the zinc oxide does not count as one of the fillers, but is present in the rubber mixture in combination with stearic acid.

In addition, an exemplary rubber mixture also comprises further additives.

Further additives can include, for example—in addition to zinc oxide (ZnO) and stearic acid—optionally silane coupling agents for the binding of silica to the polymer chains of the rubbers present, plasticizers, a vulcanization system composed of sulfur and/or sulfur donors with the aid of vulcanization accelerators, antiozonants, aging stabilizers, tackifying resins, masticating aids, and further activators or processing aids, for example fatty acid salts such as zinc soaps and fatty acid esters and derivatives thereof, for example zinc stearate, or zinc complexes, for example zinc ethyl hexanoate.

Silane coupling agents used can be any silane coupling agents known to those skilled in the art for use in rubber mixtures. It is possible here to use one or more different silane coupling agents in combination with one another. The rubber mixture can thus comprise a mixture of different silanes.

The silane coupling agents react with the surface silanol groups of the silica or other polar groups during the mixing of the rubber or of the rubber mixture (in situ) or in the manner of a pretreatment (premodification) even before addition of the filler to the rubber. Such coupling agents known from the prior art are bifunctional organosilanes that have at least one alkoxy, cycloalkoxy, or phenoxy group as a leaving group on the silicon atom and have, as another functionality, a group that can, after dissociation if appropriate, enter into a chemical reaction with the double bonds of the polymer. The latter group can, for example, be one of the following chemical groups: —SCN, —SH, —NH$_2$, or —S$_x$— (with x=2 to 8).

For example, silane coupling agents used can be 3-mercaptopropyltriethoxysilane, 3-thiocyanatopropyltrimethoxysilane, or 3,3'-bis(triethoxysilylpropyl) polysulfides having 2 to 8 sulfur atoms, for example 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT can, for example, also be added as a mixture with industrial carbon black (trade name: X50S® from Evonik).

For example, a silane mixture can be incorporated comprising disulfides present at from 40% to 100% by weight or 55% to 85% by weight of disulfides, or 60% to 80% by weight of disulfides. A mixture of this kind is available, for example, under the Si 261® trade name from Evonik, which is described, for example, in U.S. Pat. No. 8,252,863.

Blocked mercaptosilanes, as are known, for example, from WO 99/09036, can also be used as silane coupling agents. It is also possible to use silanes as described in U.S. Pat. Nos. 7,968,633 B2, 7,968,636 B2, 7,968,635 B2, and 7,968,634 B2. It is possible to use, for example, silanes that are marketed under the NXT name (for example 3-(octanoylthio)-1-propyltriethoxysilane) in a number of variants by Momentive, USA, or those that are marketed under the name VP Si 363® by Evonik Industries. It is also conceivable that one of the abovementioned mercaptosilanes, especially 3-mercaptopropyltriethoxysilane, is used in combination with processing aids (that are listed below), for example, PEG carboxylates.

In addition, the rubber mixture can comprise further activators and/or agents for the binding of fillers, such as carbon black. The latter can, for example, be the compound S-(3-aminopropyl)thiosulfuric acid as disclosed, for example, in U.S. Pat. Pub. No. 2013/0131240 A1, and/or metal salts thereof that gives rise to very good physical properties of the rubber mixture, for example when used in combination with at least one carbon black as filler.

The proportion by weight of the total amount of further additives can be 3 to 150 phr, 3 to 100 phr, or 5 to 80 phr, for example.

Exemplary plasticizers include all the plasticizers that are known to those skilled in the art, such as aromatic, naphthenic, or paraffinic mineral oil plasticizers, for example MES (mild extraction solvate), RAE (residual aromatic extract), TDAE (treated distillate aromatic extract), rubber-to-liquid oils (RTL), biomass-to-liquid oils (BTL), such as those having a content of polycyclic aromatics of less than 3% by weight according to method IP 346, rapeseed oil, factices or plasticizer resins that are not among the tackifying resins mentioned above, and/or liquid polymers having a mean molecular weight (determination by GPC=gel permeation chromatography, in accordance with BS ISO 11344: 2004) of between 500 and 20 000 g/mol. If additional liquid polymers are used as plasticizers in the disclosed rubber mixtures, these are not counted as rubber in the calculation of the composition of the polymer matrix.

The unit "phr" (parts per hundred parts of rubber by weight) used in this text is the standard unit of amount for blend recipes in the rubber industry. The dosage of the parts by weight of the individual substances is always based here on 100 parts by weight of the total mass of all rubbers present in the mixture.

The vulcanization of the disclosed sulfur-crosslinkable rubber mixtures is conducted in the presence of sulfur and/or sulfur donors with the aid of vulcanization accelerators, it being possible for some vulcanization accelerators to act simultaneously as sulfur donors. The accelerator can be selected from the group consisting of thiazole accelerators, mercapto accelerators, sulfenamide accelerators, thiocarbamate accelerators, thiuram accelerators, thiophosphate accelerators, thiourea accelerators, xanthogenate accelerators, and/or guanidine accelerators. Exemplary sulfenamide accelerators include N-cyclohexyl-2-benzothiazolesulfenamide (CBS), N,N-dicyclohexylbenzothiazole-2-sulfenamide (DCBS), benzothiazyl-2-sulfenomorpholide (MBS), and/or N-tert-butyl-2-benzothiazylsulfenamide (TBBS).

Sulfur-donating substances used can be any of the sulfur-donating substances known to those skilled in the art. If the rubber mixture comprises a sulfur-donating substance, it can be, for example, thiuram disulfides, for example tetrabenzylthiuram disulfide (TBzTD), tetramethylthiuram disulfide (TMTD), tetraethylthiuram disulfide (TETD), thiuram tetrasulfides, for example dipentamethylenethiuram tetrasulfide (DPTT), and/or dithiophosphates, for example DipDis (bis(diisopropyl)thiophosphoryl disulfide), bis(O,O-2-ethylhexylthiophosphoryl) polysulfide (for example Rhenocure SDT 50®, Rheinchemie GmbH), zinc dichloryldithiophosphate (for example Rhenocure ZDT/S®, Rheinchemie GmbH), zinc alkyldithiophosphate, 1,6-bis(N,N-dibenzylthiocarbamoyldithio)hexane, diaryl polysulfides, and/or dialkyl polysulfides.

Further network-forming systems as obtainable, for example, under the Vulkuren®, Duralink® or Perkalink® trade names or network-forming systems as described in U.S. Pat. No. 8,182,626 can also be used in the rubber mixture.

Also disclosed is the use of the sulfur-crosslinkable rubber mixtures described herein for the production of a motor vehicle tire. Thus, disclosed are motor vehicle tires, the production of which involves using at least one sulfur-crosslinkable rubber mixture described herein—comprising at least one polymer described herein, prepared with at least one RAFT agent disclosed herein.

The disclosed motor vehicle tires are understood to mean pneumatic motor vehicle tires and solid rubber tires, including tires for industrial and construction site vehicles, and truck, car and bicycle tires.

In one exemplary embodiment, the tire is a pneumatic motor vehicle tire.

In this context, use in all tire components is conceivable in principle, such as, more particularly, the tread and/or the sidewall and/or in at least one inner component.

Internal tire components refer essentially to the squeegee, inner liner, core profile, breaker belt, shoulder, breaker belt profile, carcass, bead reinforcement, bead profile, flange profile, and bandage, for example.

Rubber mixtures disclosed herein for the inner tire components and the sidewall are also referred to as body mixtures.

However, in one embodiment, the rubber mixtures disclosed herein is used in the treads of motor vehicle tires, for instance at least in the cap of treads with cap/base construction.

Treads make a considerable contribution to the rolling resistance of the motor vehicle tire.

For use in motor vehicle tires, the mixture is brought into the shape of a tread, for instance at least into the shape of a tread cap, as a finished mixture prior to vulcanization, and applied in the known manner in the production of the motor vehicle tire blank. However, the tread, for instance at least the tread cap, can also be rolled up in the form of a narrow strip of rubber mixture onto a tire blank. In the case of two-part treads (upper part: cap and lower part: base), the rubber mixtures disclosed herein can be used both for the cap and for the base.

The production of the disclosed rubber mixtures for use as body mixtures in motor vehicle tires is effected as described above for the tread. The difference lies in the shaping after the extrusion operation or the calendaring of the mixture. The shapes of the as yet unvulcanized rubber mixture for one or more different body mixtures that are obtained in this way then serve for the construction of a tire blank.

The tire blank is then vulcanized under conditions known in the prior art.

The disclosed sulfur-crosslinkable rubber mixtures can also be used for production of a cord, belt, or hose.

For use of the disclosed rubber mixtures in cords, hoses, and belts, the extruded, as yet unvulcanized mixture is converted to the appropriate shape and, if appropriate, frequently provided at the same time or subsequently with strengthening members, for example synthetic fibers or steel cords. This usually gives rise to a multilayer construction of this kind, consisting of one and/or more plies of rubber mixture, one and/or more plies of identical and/or different strengthening members and one and/or more further plies of the same and/or another rubber mixture.

It is understood that the foregoing description is that of the alternative embodiments and that various changes and modifications can be made thereto without departing from the spirit and scope of the disclosure as defined in the appended claims.

What is claimed is:

1. A RAFT agent of formula I):

Z—C(=S)—S—R—S—P,    I)

wherein
Z is a Z group typical of RAFT polymerization,
R is an R group typical of RAFT polymerization,
C is a carbon atom,
S is a sulfur atom,
P is a protecting group selected from the group consisting of: S(=O)$_2$—R$^1$, S—C(=S)—N—R$^2$R$^3$, C(=O)—R$^4$, N—R$^5$R$^6$, SiR$^7$R$^8$R$^9$, and S(=O)$_2$—OM,
R$^1$=alkyl, benzyl, or phenyl,
R$^2$ and R$^3$=alkyl, benzyl, or phenyl,
R$^4$=alkyl,
R$^5$=hydrogen atom (H), alkyl, benzyl, or phenyl,
R$^6$=alkyl, benzyl, or phenyl,
R$^7$, R$^8$ and R$^9$=alkyl or benzyl, and
M=Na, K, or H.

2. A RAFT agent of formula II):

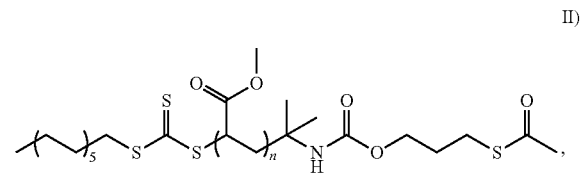

wherein n is between 13 and 22.

3. The RAFT agent of claim 1, wherein Z is selected from the following groups:

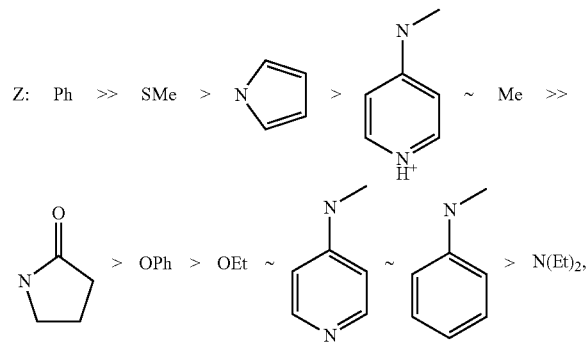

wherein Ph is phenyl, Me is methyl, and Et is ethyl.

4. The RAFT agent of claim 1,
wherein Z is selected from the group consisting of:
a) phenyl,
b) phenoxy,
c) alkoxy (O-alkyl) having 1 to 30 carbon atoms, wherein the alkyl is branched or unbranched,
d) alkyl having 1 to 30 carbon atoms, wherein the alkyl is branched or unbranched,
e) S-alkyl having 1 to 30 carbon atoms, wherein attachment to the —C(=S)—S—R—S—P radical of the RAFT agent is via the sulfur atom, and wherein the alkyl is branched or unbranched,
f) a heterocyclic group,
g) alkyl(phenyl)amino, wherein alkyl is 1 to 30 carbon atoms, wherein attachment to the —C(=S)—S—R—S—P radical of the RAFT agent is via the nitrogen atom, and wherein the alkyl is branched or unbranched, and
h) dialkylamino, wherein alkyl is 1 to 30 carbon atoms, wherein each alkyl is independently branched or unbranched, wherein attachment to the —C(=S)—S—R—S—P radical of the RAFT agent is via the nitrogen atom, and wherein each alkyl group is the same or different,
and
wherein R is selected from the group consisting of: cyanoisopropyl, 2-phenylpropan-2-yl, cyano(phenyl)methyl, 1-ethoxy-2-methyl-1-oxopropan-2-yl, 2,4,4- trimethylpentan-2-yl, 1-cyanoethyl, 1-phenylethyl, tert-butyl, cyanomethyl, and benzyl.

5. The RAFT agent of claim 1, wherein R is a polymethacrylate group comprising at least a first methacrylate unit that optionally comprises a carbamate group or a dithiocarbamate group, wherein attachment to the Z—C(=S)—S— radical of the RAFT agent is via a secondary carbon atom of the first methacrylate unit of the polymethacrylate group.

6. A RAFT agent of formula III):

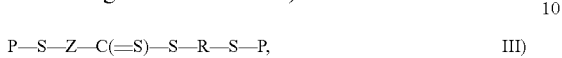

P—S—Z—C(=S)—S—R—S—P,   (III)

wherein
Z is a Z group typical of RAFT polymerization,
R is an R group typical of RAFT polymerization,
C is a carbon atom,
S is a sulfur atom,
P is a protecting group selected from the group consisting of: S(=O)$_2$—R$^1$, S—C(=S)—N—R$^2$R$^3$, C(=O)—R$^4$, N—R$^5$R$^6$, SiR$^7$R$^8$R$^9$, and S(=O)$_2$—OM,
R$^1$=alkyl, benzyl, or phenyl,
R$^2$ and R$^3$=alkyl, benzyl, or phenyl,
R$^4$=alkyl,
R$^5$=hydrogen atom (H), alkyl, benzyl or phenyl,
R$^6$=alkyl, benzyl, or phenyl,
R$^7$, R$^8$ and R$^9$=alkyl or benzyl, and
M=Na, K, or H.

7. The RAFT agent of claim 6, wherein Z is selected from the following groups:

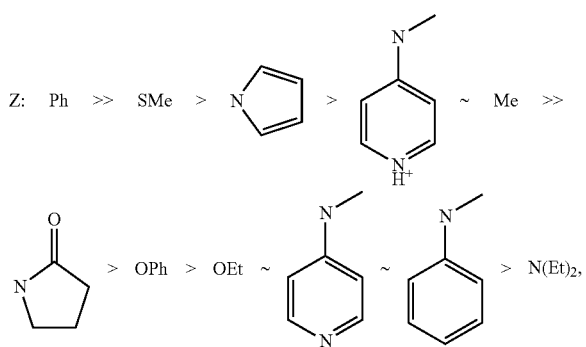

wherein Ph is phenyl, Me is methyl, and Et is ethyl.

8. The RAFT agent of claim 6,
wherein Z is selected from the group consisting of:
a) phenyl,
b) phenoxy,
c) alkoxy (O-alkyl) having 1 to 30 carbon atoms, wherein the alkyl is branched or unbranched,
d) alkyl having 1 to 30 carbon atoms, wherein the alkyl is branched or unbranched,
e) S-alkyl having 1 to 30 carbon atoms, wherein attachment to the —C(=S)—S—R—S—P radical of the RAFT agent is via the sulfur atom, and wherein the alkyl is branched or unbranched,
f) a heterocyclic group,
g) alkyl(phenyl)amino, wherein alkyl is 1 to 30 carbon atoms, wherein attachment to the —C(=S)—S— R—S—P radical of the RAFT agent is via the nitrogen atom, and wherein the alkyl is branched or unbranched, and h) dialkylamino, wherein alkyl is 1 to 30 carbon atoms, wherein each alkyl is independently branched or unbranched, wherein attachment to the —C(=S)— S—R—S—P radical of the RAFT agent is via the nitrogen atom, and wherein each alkyl group is the same or different,
and
wherein R is selected from the group consisting of: cyanoisopropyl, 2-phenylpropan-2-yl, cyano(phenyl) methyl, 1-ethoxy-2-methyl-1-oxopropan-2-yl, 2,4,4-trimethylpentan-2-yl, 1-cyanoethyl, 1-phenylethyl, tert-butyl, cyanomethyl, and benzyl.

9. The RAFT agent of claim 6, wherein R is a polymethacrylate group comprising at least a first methacrylate unit that optionally comprises a carbamate group or a dithiocarbamate group, wherein attachment to the Z—C(=S)—S— radical of the RAFT agent is via a secondary carbon atom of the first methacrylate unit of the polymethacrylate group.

10. A method of polymerizing alkene, diene, vinyl, and/or vinylidene, which comprises reacting an alkene, diene, vinyl, and/or vinylidene monomer with the RAFT agent of claim 1.

11. A method of polymerizing alkene, diene, vinyl, and/or vinylidene, which comprises reacting an alkene, diene, vinyl, and/or vinylidene monomer with the RAFT agent of claim 6.

12. A process for preparing an alkene, diene, vinyl, and/or vinylidene polymer chain, which comprises:
reacting an alkene, diene, vinyl, and/or vinylidene monomer with the RAFT agent of claim 1,
wherein the polymer chain comprises at least one —R— S—P molecular moiety of the RAFT agent at the start of the polymer chain, and
wherein the polymer chain comprises at least one molecular moiety Z—C(=S)—S— at the end of the polymer chain.

13. A process for preparing an alkene, diene, vinyl, and/or vinylidene polymer chain, which comprises:
reacting an alkene, diene, vinyl, and/or vinylidene monomer with the RAFT agent of claim 6,
wherein the polymer chain comprises at least one —R— S—P molecular moiety of the RAFT agent at the start of the polymer chain, and
wherein the polymer chain comprises at least one molecular moiety Z—C(=S)—S— at the end of the polymer chain.

14. A sulfur-crosslinkable rubber mixture comprising the polymer chain of claim 12.

15. A sulfur-crosslinkable rubber mixture comprising the polymer chain of claim 13.

16. A motor vehicle tire comprising the sulfur-crosslinkable rubber mixture of claim 14.

17. A motor vehicle tire comprising the sulfur-crosslinkable rubber mixture of claim 15.

18. A cord, belt, or hose comprising the sulfur-crosslinkable rubber mixture of claim 14.

19. A cord, belt, or hose comprising the sulfur-crosslinkable rubber mixture of claim 15.

* * * * *